United States Patent [19]

McCullough

[11] 4,363,170

[45] Dec. 14, 1982

[54] BLADE HOLDER FOR MEAT TRIMMING KNIFE

[76] Inventor: Timothy J. McCullough, Box 295, Lake Rd., Vermilion, Ohio 44089

[21] Appl. No.: 202,947

[22] Filed: Nov. 3, 1980

[51] Int. Cl.$^3$ .............................................. A22C 17/04

[52] U.S. Cl. ...................................... 30/276; 17/1 G; 30/346

[58] Field of Search .......................... 17/1 G; 83/698; 408/226, 203.5, 204, 207; 30/276, 346

[56] References Cited

U.S. PATENT DOCUMENTS

| | | | |
|---|---|---|---|
| 3,024,532 | 3/1962 | Bettcher | 30/276 |
| 3,269,010 | 8/1966 | Bettcher | 30/347 X |
| 3,461,557 | 8/1969 | Behring | 30/276 |
| 4,170,063 | 10/1979 | Bettcher | 30/276 |
| 4,178,683 | 12/1979 | Bettcher | 30/276 |
| 4,198,750 | 4/1980 | Bettcher | 30/276 |
| 4,236,531 | 12/1980 | McCullough | 30/276 |

FOREIGN PATENT DOCUMENTS

| | | | |
|---|---|---|---|
| 788494 | 1/1958 | United Kingdom | 17/1 G |

*Primary Examiner*—James M. Meister
*Attorney, Agent, or Firm*—Gustalo Nunez

[57] ABSTRACT

An improved blade holder for rotatably mounting a circular-shaped meat-cutting blade on one end of a power-driven handle. A split metal ring is formed with an interior annular groove for rotatably mounting a circular cutting blade thereon. A pair of arcuate-shaped flanges generally T-shaped in cross section are formed integrally with the ring on opposite sides of the split and extend axially upwardly from the top wall of the ring. The T-shaped flanges form an alignment groove for properly aligning the holder on the power-driven handle, and a pair of radially inwardly extending arcuate projections. The projections are received within a pair of complementary-shaped grooves formed in a lower end of an arcuate-shaped mounting plate for removably mounting the ring on the plate. A pair of holes are formed in the mounting plate through which a pair of screws extend which are engaged in a pair of tapped holes formed in the power-driven handle for mounting the plate and attached ring on the handle. The two-piece blade holder enables the split ring to be replaced periodically without replacing the entire blade holder assembly as heretofore required with one-piece all-metal holders.

4 Claims, 13 Drawing Figures

BLADE HOLDER FOR MEAT TRIMMING KNIFE

BACKGROUND OF THE INVENTION

1. Field of the Invention

The invention relates to meat-cutting devices and particularly to a power-driven meat-cutting tool adapted to be manually held and manipulated for the quick and easy removal of meat from carcasses and bones. More particularly, the invention relates to an improved blade holder for rotatably mounting the blade on the handle consisting of two separate components, both of which can be produced at a lower cost than the prior one-piece all-metal blade holders, and in which only one of the components periodically requires replacement, thereby resulting in a savings to the ultimate user.

2. Description of the Prior Art

Various styles of power-driven meat-cutting tools have been devised wherein a ring blade is rotatably mounted within a holder which, in turn, is mounted on a manually operated power-driven handle. These tools have been used for some time to facilitate the removal of meat from a carcass, primarily in a trimming operation, or for removing the meat remains from the animal bones. Examples of such meat-cutting tools are shown in U.S. Pat. Nos. 3,024,532, 3,176,397, 3,269,010, 3,461,557 and 3,852,882.

One of the preferred types of such meat-cutting tools is the type shown in U.S. Pat. No. 3,269,010. This tool consists on an annular metal ring having an internal blade mounting groove formed therein, with a pair of metal scalloped lugs being formed on opposite sides of a split in the ring and formed integrally with the metal of the ring. A gear-receiving chamber is formed in the scalloped lugs in addition to mounting holes for attaching the blade holder to an end of a power-driven handle. These types of blade holders are formed entirely of metal and require a considerable number of machining and metal working operations to form the final configuration from a piece of tubular metal stock.

Proper heat treatment of these prior blade holder constructions also is difficult due to the relatively thin wall thickness of the ring blade or race portion in contrast to the considerably thicker scalloped mounting flange portions of the blade holder. These uneven wall thicknesses can result in fatigue in the thinner split ring during the heat-treating procedure lessening the ring life. Also, the ring portion of the blade holder becomes worn after a certain period of use, requiring replacement of the entire blade holder since the scalloped mounting flanges are formed integrally with the ring, even though they are not worn or damaged.

Many of these problems have been eliminated by my improved blade holder and method of making the same in which the scalloped mounting lugs are injection molded on a metal insert ring, as shown and described in my copending application Ser. No. 061,593, filed July 30, 1979, now U.S. Pat. No. 4,236,531.

In certain meat-trimming operations, these plastic molded mounting lugs may show excess fatigue than desirable due to the extreme forces and stresses placed thereon during the particular meat-trimming procedure. Therefore, it is desirable that the mounting flanges be formed of metal or of a stronger synthetic material to eliminate this excess fatigue without forming the entire blade holder as an integral one-piece member.

No blade holder construction of which I am aware has eliminated these costly metal-working procedures and fatigue problems by a two-piece blade holder in which the blade-holding mounting ring and mounting plate are formed as separate components and detachably connected together when mounting the holder on the end of a power-driven handle.

SUMMARY OF THE INVENTION

Objectives of the invention include providing an improved blade holder construction for a meat-trimming knife which consists of two separate components, each of which can be produced relatively inexpensively in separate manufacturing procedures in comparison to the intergral, all-metal, one-piece blade holder construction heretofore used in the meat-trimming industry. The improved blade holder consists of an annular metal ring for rotatably mounting an annular blade therein in which the ring can be manufactured easily and inexpensively from tubular stock by usual metal-working operations, in which most of the machining operations are completed prior to heat treating the formed ring, and in which the ring is of a generally uniform thin cross-sectional configuration, thereby eliminating the heretofore expensive grinding procedures required in the manufacture of the prior all-metal, one-piece blade holders. Another object of the invention is to provide a mounting plate for the blade holder ring which is formed of an arcuate-shaped member, which member can be machined inexpensively from tubular bar stock by simple metal-working operations, and in which the member can be heat treated evenly throughout due to its uniform thickness, since it is not attached to the thinner blade-holding ring. Furthermore, the heat treating of the mounting plate can even be eliminated, if desired, since it has no bearing surfaces, thereby reducing manufacturing costs. Another object is to provide a blade holder in which the blade-holding ring can be periodically replaced when worn without replacing the entire blade holder, since the arcuate mounting plate can be reused continuously throughout the life of the blade holder for attaching the ring on the power-driven handle. A still further object of the invention is to provide an improved two-piece blade housing which can be mounted on either electrically or air-driven handles without requiring any modifications to the handles since the mounting plate is formed with the usual attachment screw-receiving holes and alignment grooves therein. Also, the improved blade holder construction achieves the desired results with considerably less expense than believed heretofore possible by savings in both labor and material costs during manufacture, in which the blade holder eliminates difficulties existing in the art, and in which it solves problems and satisfies present needs.

These objectives and advantages are obtained by the improved blade holder construction for a meat-trimming knife having an annular-shaped metal ring split at one point on its periphery and formed with an interior annular groove for rotatably mounting a complementary-shaped cutting blade therein. An arcuate-shaped blade holder mounting plate is provided with means complementary to other means formed on the split metal ring for removably attaching the split metal ring on the mounting plate. Opening means are formed on the mounting plate for receiving attachment screws therein for releasably securing the mounting plate and attached split metal ring on a power drive handle of a meat-cutting tool.

BRIEF DESCRIPTION OF THE DRAWINGS

Further objectives and advantages of the invention will be hereafter referred to and/or be apparent from the following description of the preferred embodiment of the improved blade holder construction, shown particularly in the accompanying drawings and set forth in the claims.

DESCRIPTION OF THE PREFERRED EMBODIMENT

Figure 1:
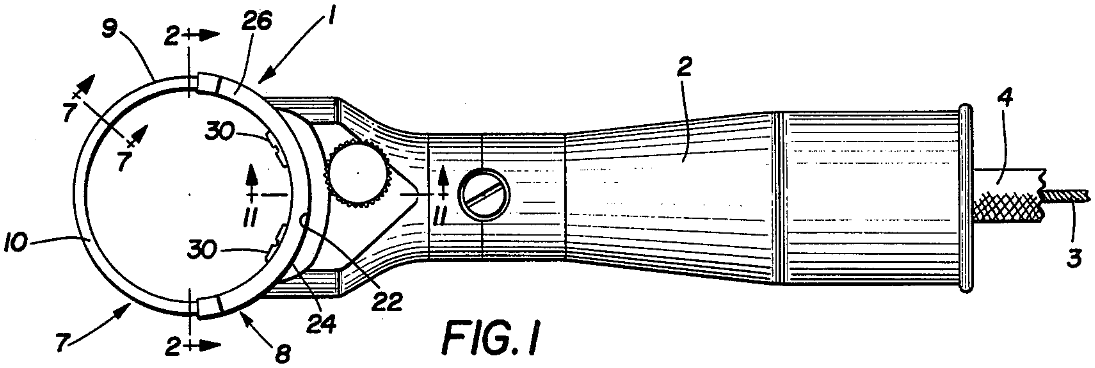
FIG. 1 is a top plan view of the improved blade holder mounted on a power-driven handle.
Figure 5:
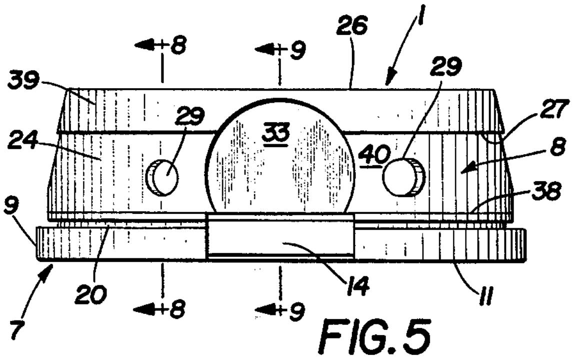
FIG. 5 is a front elevational view of the improved blade holder.
Figure 6:
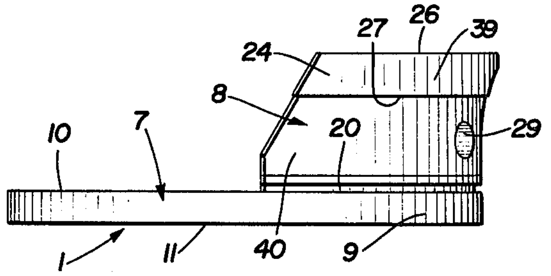
FIG. 6 is a left-hand side elevational view of the blade holder as shown in FIG. 5.
Figure 3:
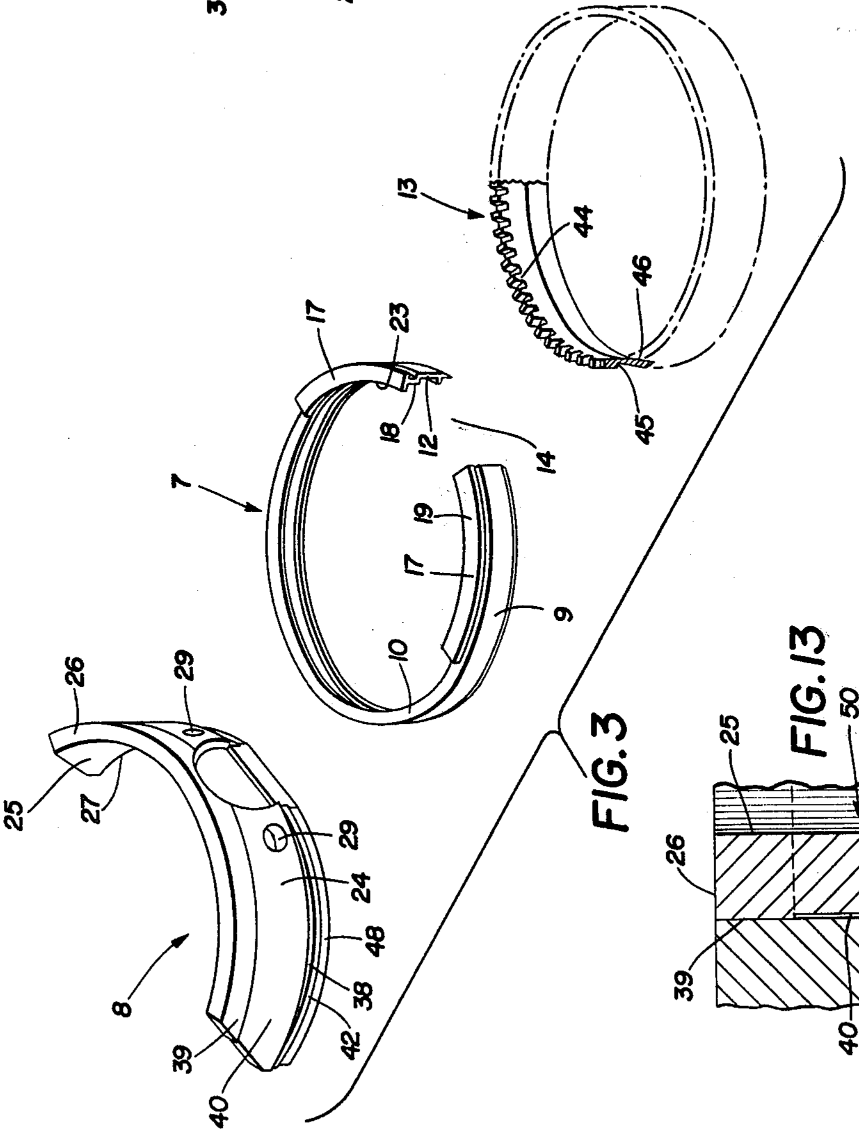
FIG. 3 is an exploded perspective view of the main components of the two-piece blade holder construction with a portion of a cutting blade shown in solid and dot-dash lines.

The improved blade holder construction is indicated generally at 1, and is shown in disassembled condition in FIG. 3 and in assembled condition in FIGS. 5 and 6. Blade holder 1 is shown in FIG. 1 mounted on a power-driven handpiece 2. The particular handpiece 2 shown in the drawings is driven by a remote electric motor (not shown) which is connected to handpiece 2 by a power-driven cable 3 located within an outer casing 4. If desired, handpiece 2 could have an air-driven motor mounted within the handle which is connected to a compressor by a flexible air hose, without departing from the concept of the invention. Thus, improved blade holder 1 is adaptable for use either on an electric- or air-driven handpiece of the type shown in U.S. Pat. Nos. 3,269,010 and 3,852,882, respectively.

Figure 7:
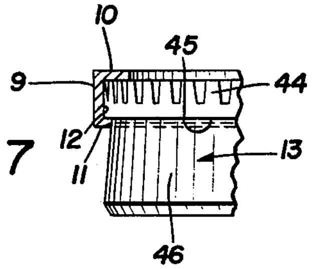
FIG. 7 is an enlarged fragmentary sectional view taken on line 7—7, FIG. 1.
Figure 2:
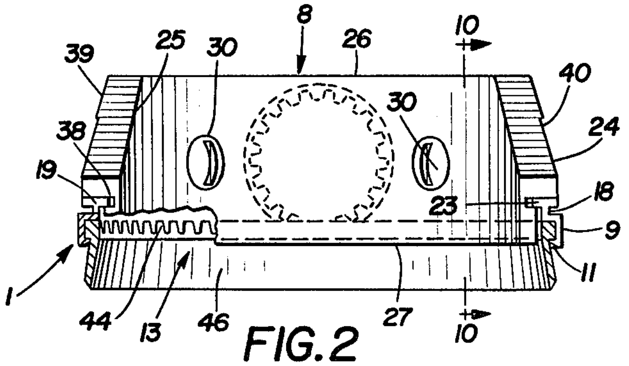
FIG. 2 is an enlarged sectional view taken on line 2—2, FIG. 1, with parts broken away and in section.

Improved blade holder 1 includes two main components, an annular-shaped blade holding split ring 7 and an arcuate-shaped mounting plate 8 (FIG. 3). Ring 7 is formed by a cylindrical side wall 9 terminating in a radially inturned annular top wall 10 and an annular radially inturned bottom wall or blade-supporting ledge 11 (FIG. 7). Ring walls 9, 10 and 11 form an internal annular groove 12 for rotatably supporting a circular cuttng blade 13 therein. A gap or split 14 is formed at one point in the periphery of ring 7 approximately 30°, although this can vary, if desired.

Figure 8:
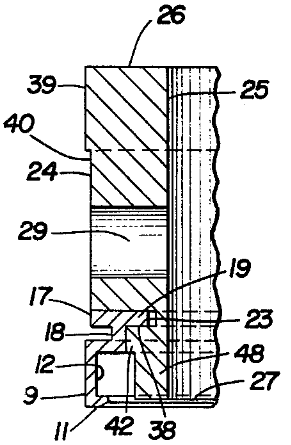
FIG. 8 is an enlarged fragmentary sectional view taken on line 8—8, FIG. 5.
Figure 9:
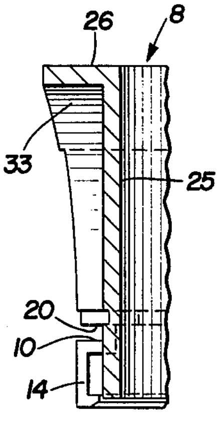
FIG. 9 is an enlarged fragmentary sectional view taken on line 9—9, FIG. 5.
Figure 10:
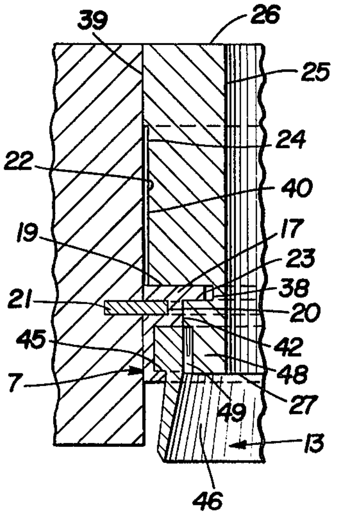
FIG. 10 is an enlarged fragmentary sectional view taken on line 10—10, FIG. 2.
Figure 4:
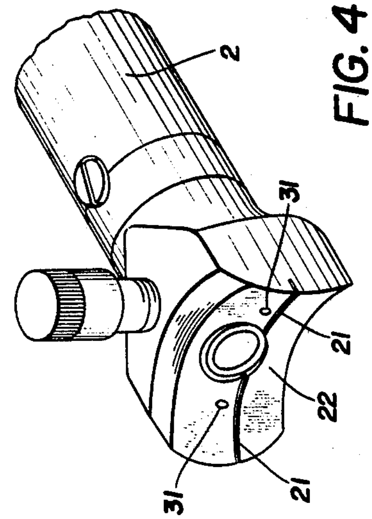
FIG. 4 is a perspective view of the end portion of a power-driven handle on which the improved blade holder is adapted to be mounted.

A pair of arcuate-shaped flanges 17 are formed integrally with and project axially upwardly from the inner edge of top wall 10 and are located adjacent gap 14 on both sides thereof and extend arcuately therefrom. Flanges 17 preferably have arcuate lengths of approximately 55° each, although this dimension may vary without affecting the concept of the invention. Referring to FIGS. 8 and 10, flanges 17 are T-shaped in cross section, having an upstanding wall member 18 and a cross member 19. Cross members 19 together with members 18 form a pair of exterior arcuate grooves 20 into which arcuate-shaped keys 21, which are embedded in the concave front surface 22 of the handpiece 2 (FIG. 4), are engaged for aligning and positioning ring 7 on handpiece 2. Cross members 19 also form a pair of arcuate-shaped, radially inwardly extending projections 23 which provide the means for removably mounting blade holder ring 7 on arcuate mounting plate 8, as described more fully below.

Figure 11:
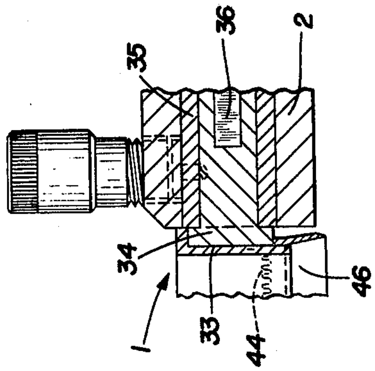
FIG. 11 is an enlarged fragmentary sectional view taken on line 11—11, FIG. 1.

Mounting plate 8 has a generally smooth convex outer surface 24 and a smooth concave inner surface 25 with top and bottom edges 26 and 27. A pair of holes 29 are formed in and extend radially through mounting plate 8 for receiving a pair of screws 30. Screws 30 are adapted to be threadably engaged within a pair of tapped holes 31 formed in arcuate surface 22 of handpiece 2 for clamping mounting plate 8 tightly against surface 22. A generally semicircular recess 33 is formed in convex outer surface 24 to form a gear-receiving recess in which a drive gear 34 (FIG. 11) is rotatably mounted. Drive gear 34 is rotatably supported in a bearing sleeve 35 mounted in the end of handpiece 2 and is driven by a squared end 36 of drive cable 3. Recess 33 is formed between plate mounting holes 29.

In further accordance with the invention, an arcuate groove 38 is formed in convex surface 24 adjacent bottom edge 27. Groove 38 is complementary in shape and size to inwardly extending projections 23 of ring flanges 17. Projections 23 are slidably mounted within arcuate groove 38 for removably mounting ring 7 on mounting plate 8, as shown particularly in FIGS. 8 and 10.

An upper portion 39 of plate convex surface 24 has a larger radius of curvature than intermediate portion 40, also shown in FIGS. 8 and 10, whereby upper portion 39 provides the clamping pressure zone which is abutted against arcuate surface 22 of handpiece 2 when plate 8 is clamped thereagainst by screws 30. Arcuate groove 38 is formed by an arcuate ledge 42 which is recessed inwardly from upper and intermediate arcuate portions 39 and 40 of convex surface 24 and provides the pressure clamping zone or surface which is clamped against the inner surface of upstanding wall member 18 of ring flanges 17 for clamping ring 7 securely against arcuate surface 22 of handpiece 2 (FIG. 10).

Thus, ring 7 is removably mounted on mounting plate 8 by the slip-fit engagement of flange projections 23 in complementary-shaped arcuate groove 38 of mounting plate 8. The assembled two-piece blade holder 1 then is clamped tightly against arcuate surface 22 of handpiece 2 by screws 30 with blade 13 being rotatably mounted within ring groove 12, as in the heretofore one-piece blade holder. Cutting blade 13 is formed with blade-driving gear teeth 44 along the upper edge and extending circumferentially about cutting blade 13 (FIGS. 3 and 7). An inwardly extending annular shoulder 45 is formed between gear teeth 44 and conical blade wall 46

(FIG. 7) and is slidably mounted on and supported by bottom wall or ledge 11 of ring 7. Blade gear teeth 44 are in meshing engagement with drive gear 34 (FIG. 11) for rotatably driving blade 13 on blade holder 1 in a usual manner.

In accordance with another feature of the invention, concave inner surface 25 of mounting plate 8 extends downwardly beyond arcuate ledge 42 a predetermined distance (FIG. 10) to form an arcuate flange or skirt 48 integral with concave surface 25. Flange 48 is adapted to extend downwardly just below the bottom of blade gear teeth 44 and spaced therefrom by a gap 49 to provide a cover for gear teeth 44, reducing the collection of meat and bone particles in the gear teeth which affects the meshing engagement of teeth 44 with drive gear 34.

Figure 12:
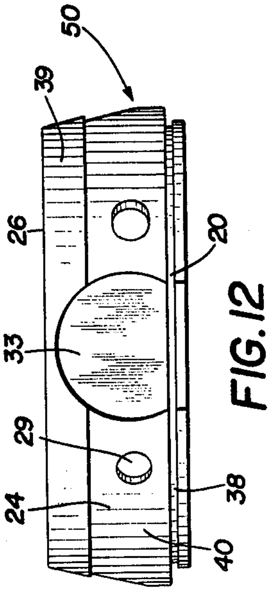
FIG. 12 is a front elevational view somewhat similar to FIG. 5 showing a modified form of the mounting plate.
Figure 13:
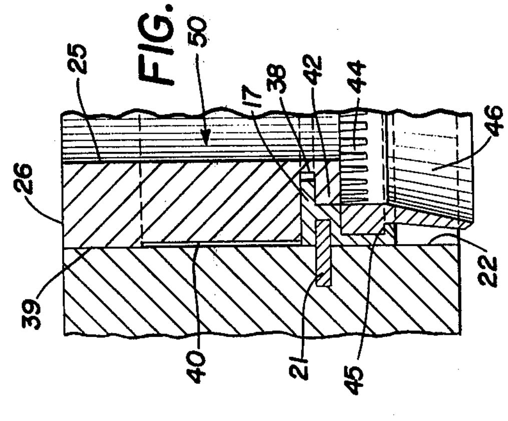
FIG. 13 is an enlarged fragmentary sectional view similar to FIG. 10 with the modified mounting plate of FIG. 12 being assembled with the split ring.

FIG. 12 shows a modified mounting plate for the improved blade holder, indicated generally at 50. Mounting plate 50 is identical to mounting plate 8 except that the bottom edge of concave inner surface 25 terminates adjacent the top of blade teeth 44 (FIG. 13) and does not extend downwardly below the gear teeth to form a cover therefor, as provided by arcuate flange or skirt portion 48 of arcuate mounting plate 8. All other features and components of modified mounting plate 50 are the same as described above for plate 8, with the only difference being the termination point of concave inner surface 25.

Improved blade holder construction 1 provides a two-piece blade holder consisting of a blade holder ring 7 and an arcuate mounting plate 8 or 50 into which the ring is removably slidably engaged by the engagement of arcuate flange projections 23 formed on the ring within complementary-shaped groove 38 formed in the convex arcuate surface 24 of the mounting plate generally adjacent the lower edge thereof. This two-piece combination then is mounted on the arcuate end surface of a usual power-driven handpiece by screws 30 with the meat-trimming blade being rotatably mounted on ring 7 in a usual manner. This construction enables ring 7 to be replaced periodically as it becomes worn without replacing the entire blade holder since mounting plates 8 and 50 receive no appreciable wear. Plates 8 and 50 have no bearing surfaces against which any moving components are engaged since the rotation of cutting blade 13 is entirely within and against ring 7. Thus, only a relatively inexpensive ring 7 need be purchased instead of the entire blade holder, as is required in the integral one-piece, all-metal blade holder, when the ring becomes worn. In order to replace ring 7 with a new blade-holding ring, the blade holder is removed from handpiece 2 by removal of screws 30, enabling the ring 7 to be slidably detached from either mounting plate 8 or 50 with a new ring 7 and new blade 13 being easily reattached on the mounting plate for subsequent clamping engagement against the end of handpiece 2 by screws 30. Thus, it is easily seen that the improved blade holder provides a relatively inexpensive assembly which can be manufactured easier and cheaper than the prior all-metal, one-piece blade holder assemblies, and which is attached on the end of either an electric- or air-driven handpiece by two mounting screws in the same manner as the one-piece blade holders, and which provides the same results as the one-piece construction but at a lower price.

Another advantage of the improved blade holder construction is that mounting plates 8 and 50 need not be heat treated unless desired, since they do not provide a bearing surface for the blade. Also, due to the relative uniform thickness of each of the separate components, ring 7 and mounting plate 8 or 50, fewer problems occur during the heat treating thereof than in the prior one-piece blade holder construction.

Although ring 7 and mounting plates 8 and 50 preferably are formed of metal, it may be possible to form one or both of these components of a synthetic plastic material or the like for certain applications without departing from the concept of the invention.

As will be apparent to those skilled in the art to which the invention relates, the above-described invention should not be limited to the particular construction shown and described but may be modified, and it is the intention to hereby cover all adaptations, modifications and uses thereof which come within the practice of those skilled in the art to which the invention relates and should not be so limited but include those changes and modifications coming within the terms of the claims set forth below.

I claim:

1. A blade holder construction for a meat-cutting tool of the type having a power-driven handle assembly with a concave arcuate surface at one end formed with two tapped holes therein and having a drive gear rotatably supported in the handle assembly for driving a gear toothed ring blade adapted to be rotatably supported by the blade holder construction, said blade holder construction including:

(a) a split annular-shaped ring;

(b) an interior, annular groove formed in the ring for rotatably mounting a complementary-shaped cutting blade therein;

(c) inwardly projecting arcuate flange means formed integrally with the ring;

(d) exterior arcuate groove means formed in the ring for engagement with alignment keys mounted on the concave arcuate surface of the power-driven handle;

(e) an arcuate-shaped plate formed with a drive gear-receiving recess and a pair of holes, said holes being adapted to align with the tapped holes of the power-driven handle for receiving a pair of screws therethrough for removably attaching the plate on the concave surface of said handle, and said plate having a smooth concave inner surface and a generally smooth convex outer surface; in which said outer surface is formed with an end portion having a larger radius of curvature than an adjacent intermediate portion with said larger end portion providing a contact pressure zone engageable with the arcuate end surface of the handle when the blade holder is attached to said handle; and (f) arcuate groove means formed in the plate, said plate groove means being complementary to and removably engaged with the inwardly extending arcuate flange means of the ring to removably mount said ring on the plate.

2. The construction defined in claim 1 in which the arucate flange means and arcuate groove means formed on the ring are formed by a T-shaped, cross-sectional arcuate upstanding portion of the ring.

3. The construction defined in claim 1 in which an arcuate portion of the plate extends beyond the ring-receiving groove means a predetermined distance in a direction away from the gear-receiving recess to provide a cover for gear teeth formed on the cutting blade.

4. A blade holder construction for a meat-cutting tools of the type having a power-driven handle assembly with a concave arcuate surface at one end formed with two tapped holes therein and having a drive gear rotatably supported in the handle assembly for driving a gear tooth ring blade adapted to be rotatably supported by the blade holder construction, said blade holder construction including:

(a) an annular-shaped metal ring split at one point and having exterior arcuate grooves formed on both sides of the split to provide circumferentially extending alignment grooves for engagement with alignment members of a power driven handle, said metal ring further including inwardly extending arcuate-shaped flanges formed on each side of the split, said arcuate shaped flanges being of a length sufficient to provide an anti debri cover for gear teeth formed along an edge of a cutting blade when the cutting blade gear teeth are adjacent the mounting plate, said metal ring further including a split annular shaped, top wall, a split annular shaped side wall and a split annular shaped radially inwardly extending ledge spaced from said top wall with said walls and ledge forming a cutting blade mounting groove, (b) an arcuate-shaped blade holder mounting plate having formed thereon a semicircular recess for accommodating some gear means, and having a pair of spaced holes located at some point, each equidistant from said semicircular recess, said spaced openings designed for receiving attachment screws for releasably securing said mounting plate and split metal ring onto a power driven handle, said blade holder further including inner and outer arcuate surfaces, in which an arcuate grove is formed in the outer arcuate surface and is located adjacent and extends along an edge of said mounting plate, said arcuate groove being complementary to the arcuate shaped flanges on said metal ring thereby permitting said metal ring to be removably attached to said blade holder mounting plate.

* * * * *